United States Patent Office 2,758,948
Patented Aug. 14, 1956

2,758,948

METHOD OF FORMING A LIGHT-TRANSPARENT ELECTRICALLY CONDUCTIVE COATING ON A SURFACE AND ARTICLE FORMED THEREBY

Eli Simon, Los Angeles, and Frank W. Thomas, Burbank, Calif., assignors to Lockheed Aircraft Corporation, Burbank, Calif.

No Drawing. Application February 2, 1953, Serial No. 334,748

8 Claims. (Cl. 117—216)

This invention relates to processes and materials for providing electrically conductive coatings and relates more particularly to methods and compositions for providing conductive coatings for bleeding static electricity from the surfaces of non-conductive materials.

There are many situations where the accumulation of static electrical charges on electrically non-conductive materials and surfaces is undesirable and hazardous. For example the accumulation of substantial static charges on the canopies, windshields, radomes and like elements of aircraft is a serious problem and so far as we are aware, no suitable means is available at this time for dissipating or bleeding away this unwanted electricity. In the case of canopies, windshields, windows and other optically transparent-material objects and surfaces where the optical transparency must be preserved and in the case of radomes where the transparency to microwave energy must be maintained, the provision of "transparent" conductive coatings for dissipating or bleeding off the static charges has been especially difficult.

A general object of this invention is to provide practical and effective electrically conductive coatings for conducting static charges from non-conductive surfaces.

Another object of the invention is to provide conductive coatings of this kind that are substantially transparent to light, micro wave energy, electromagnetic energy, etc. The attribute of "transparency" particularly well suits the process and compositions of the invention for the treatment of aircraft enclosures, windshields, windows, lenses, and other light transmitting elements of acrylic resins and other transparent synthetic resins, glass, etc. and for the coating or treatment of radomes and other elements and devices required to transmit micro wave energy and other electromagnetic energy. It should be understood, however, that the applications of the invention are not limited to such materials or installations. For example, the conductive coatings of the invention may be applied to the surfaces of wood, synthetic and natural rubbers, phenol formaldehyde resin moldings, laminates, and the like, the various cellulose resin derivatives, melamine resin moldings, laminates, and other products, the various polystyrenes and, in fact, to practically any non-conductive surfaces. Accordingly, although we may herein place considerable emphasis on the invention as applied to or employed with light transmitting and radar energy transmitting materials and devices, such reference and emphasis should not be construed as limiting or restricting the scope of our invention.

Another object of the invention is to provide a process for treating or coating the surface of a light transmitting element or part to render the same conductive to static electricity, etc. without an appreciable loss of transparency and with a minimum of haze. The treatment or process provides a coating or substantially uniform conductivity without impairing the optical qualities of the surface. The process provides a layer or coating of substantially uniform electrical conductivity and substantially uniform optical or light transmitting properties.

Another object of the invention is to provide a method or process of the character referred to adapted to produce a conductive coating or acrylic surfaces such as Plexiglas and Lucite, either flat or of simple or compound curvature, without impairing either the mechanical or optical properties of the surfaces. The acrylic resin windshields, canopies, etc. of aircraft are delicate insofar as their surfaces are concerned, particularly when curved, being subject to crazing and other effects which interfere with their mechanical and optical characteristics. The present invention has been found to produce effective electrically conductive coatings on such surfaces without injuring the surfaces or material in any way.

Another object of the invention is to provide conductive coatings of practically any desired or required electrical conductivity. The conductivity may be adjusted from infinity to a few thousand ohms resistance per square.

A further object of the invention is to provide conductive coatings that are mechanically and chemically stable and whose conductivity remains stable when applied to aircraft surfaces to bleed off or remove accumulating precipitation static charges from dielectric materials during flight operations.

A still further object of the invention is to provide a process of the kind described characterized by the application of a resinous material primer to the previously prepared or cleaned surface which serves to hold graphite particles of three microns or less particle size in limited thickness overlapping relation to obtain the selected degree of electrical conductivity and uniformity of light and radar transmission and with freedom from haze, etc. We have found that the effective and peculiar adhesion between the primer and graphite particles obtained in practicing the process of the invention assures uniform optical transparency, mechanical stability and stable generally uniform electrical conductivity of the coating.

Other objectives and features of the invention will become apparent from the following description wherein the invention will be described in more detail.

The coatings of the invention may be applied to practically any rigid material surface, either flat or curved, provided the surface is suitably clean. In preparing or cleaning the surface any cleaner may be used which does not harm the material or adversely affect the adhesion thereto of the primer to be described below. However, in cleaning the surface of a low dielectric material it is desirable to employ a cleaner incorporating an anti-static ingredient or agent chosen from the classes of anionic or cationic wetting agents. We have had excellent results using the cationic wetting agents and specifically the quaternary ammonium salts of the following general structures:

(1) 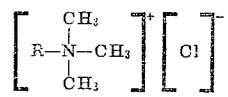

and (2) 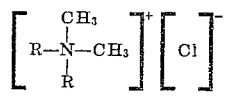

where R is a long carbon chain radical with chain length 8-20.

In cleaning acrylic plastic and glass surfaces we have found the following cleaner to be particularly effective:

Cleaner: Grams
Calcium carbonate powder—particle size
  from 0.1 to 0.01 micron _____ 5 to 25
"Coco" dimethyl ammonium chloride ___ ½ to 10
Water _____ 100

The "coco" dimethyl ammonium chloride is a product of Armour and Co. and is a quaternary ammonium salt where the R is principally the dodecyl radical.

This cleaner is an aqueous calcium carbonate dispersion with the "coco" dimethyl ammonium chloride serving as an anti-static agent We have found that the cleaner, when rubbed on the surface with a soft cloth, or the like, to remove the foreign matter therefrom, has the dual or special functions of removing the oil, grease and dirt from the surface of the canopy or other part, and depositing a residue of the anti-static agent. Of course the cleaner is not allowed to remain in appreciable or excessive quantities but is removed from the surface during the hand cleaning operation. The anti-static residue, "coco" dimethyl ammonium chloride, remains on the surface to prevent any static charges from subsequently building up on the surface during the application of the primer, which charges might distort the final conductive coating.

Following the cleansing of the surface the primer is applied thereto. The primer is a resinous material for holding the graphite platelets in overlapping and distributed relation to obtain the electrical conductivity characteristics with substantially uniform optical and electro-magnetic energy transparency. The primer also serves to establish and maintain mechanical stability of the coating by assuring good adhesion and retention of the graphite platelets, thus increasing the abrasion resistance of the conductive coating. The primer includes one or more resinous materials or polymers capable of solution in a suitable media or carrier in a concentration of from 0.01% to 0.2% by weight of the diluent or solvent. The resins and polymers that may be used in the primer are varied and depend upon the nature and composition of the surface to be treated. Thus a greater selection of primer resins or polymers is available for use on surfaces other than acrylic surfaces that are less sensitive to stress-crazing when contacted by the thinners and solvents. These include the following solutions of the low-molecular weight resins:

Vinyl chloride polymers
Acrylic copolymers
Vinylidene chloride polymers
Vinyl acetate polymers
Vinyl acetate-chloride copolymers
Chloroprene polymers
Butadiene-acrylonitrile copolymers
Butadiene-styrene copolymers Where the primer is to be used on acrylic surfaces such as Plexiglas and Lucite we prefer to incorporate polystyrene of the selected molecular weight in the primer and may also use the following polymers having a molecular weight of from 500 to 1000 instead of or blended with the polystyrene.

Alpha and beta-methylstyrene polymers
Poly chlorostyrene
Polyvinyl naphthalenes

As stated above the selection of the resinous material for incorporation in the primer depends upon the intended use or application use of the conductive coating. Primers for application to transparent acrylic surfaces will preferably incorporate styrene polymers having molecular weights ranging from 500 to 1000. A plasticizer inert to the acrylics is preferably incorporated in the primer to improve the adhesion of the conductive coating. We have found that the poly isobutylenes are particularly well suited for this purpose when used in combination with the polystyrenes. The particular solvent or diluent of the primer will, of course, likewise depend to a considerable extent upon the nature of the surface to which the conductive coating is to be applied. Where the coatings are to be applied to acrylic surfaces such as Plexiglas or Lucite, care must be taken to avoid the use of harmful solvents and in such cases solvents particularly well suited for use in the primer are those comprising predominantly aliphatic hydrocarbons or blends of aliphatic petroleum hydrocarbons having a boiling point range of from 100° F. to 300° F. including the saturated aliphatic hydrocarbons and their blends, hexane, heptane, octane, iso-octane, and blends of the same.

The following is the composition of a primer that we have found to be particularly effective in providing the transparent electrically conductive coatings on the surfaces of acrylic plastic objects such as aircraft canopies, etc.

Primer:

| | Grams |
|---|---|
| Polystyrene-molecular 500 to 1000 | 0.25 |
| Poly isobutylene-molecular weight 25,000 or more | 0.0015 |
| Aliphatic petroleum solvent blend—Ligroin-boiling point 150° to 180° F | 100 |

The above relative proportions have been found to be most effective although in practice the polystyrene may be employed in the proportion range of from 0.1 to 0.5 gram, the poly isobutylene may be used in the proportion of from 0.001 to 0.010 gram and the diluent or solvent in the proportion range of from 50 to 500 grams. As indicated above, the alpha and beta-methyl polystyrene, polychloro-styrene polyvinyl naphthalenes may be employed in the primer instead of the polystyrene.

The manner or mode of applying the primer may be dictated at least to some extent by the nature of the surface or part to which the coating is to be applied. The primer in most cases may be applied either by spraying or by hand application, using a soft cloth, a cellulosic tissue, or the like, to apply and evenly spread the primer over the surface.

The proportion of the diluent in the primer composition is so high that the final or resulting primer film causes no noticeable change in the optical or mechanical properties of the surface or material to which it is applied, the film thickness of the primer and consequently its reflection ratio or albedo being so small as to cause no haze.

The electrically conductive constituent or ingredient of the coating of the invention is preferably micronized or finely divided natural graphite. The graphite is preferably employed in a particle size of 2 microns or less, although the particle size of the graphite may be as great as 3 microns if desired. After the primer coat is dry to touch the graphite powder is applied thereto, preferably by a manual or hand operation. We have found it most practical and effective to apply the graphite powder to a fine short nap velvet cloth or mit and to then wipe or rub the mit or cloth over the primed surface to evenly distribute the graphite powder. The nap of the velvet serves to retain the graphite powder for this operation and the nap is preferably sufficiently stiff to remove the excess graphite from the primer surface and to burnish the graphite to a substantially uniform optical film without marring or scratching the same. The electrical conductivity of the coating may be varied or adjusted at will by this hand buffing with a velvet cloth or mit using moderate hand pressure until the desired conductivity is obtained. In practice we have found that the conductivity of the primer-graphite platelet coating varies essentially from an open circuit condition to the final desired value of $\frac{1}{10}$ megohm per square or less. While other fabrics and materials may be used in applying the finely divided graphite the velvet facilitates the uniform polishing of the coating to a given or desired electrical resistance per square with a minimum of manual effort.

We have determined that the electrical resistance of the coatings produced as above described, may be controlled or adjusted as desired from $10^4$ to $10^9$ ohms per square on transparent plastic material surfaces such as the surfaces of acrylic plastic aircraft canopies or enclosures and from open circuit to $10^3$ ohms per square on non-transparent surfaces such as rubber, Micarta, wood, and filled plastic such as phenolic ureas, melamines, etc. The primer coat is such that a layer of graphite platelets approximately one platelet thick may be obtained providing for maximum and uniform light transmission and radar energy transmission. The conductive transparent coatings are water repellant and abrasion resistant and when applied to aircraft enclosures, canopies, etc. produce an anti-glare effect. It will be observed that the coatings are prepared or produced from relatively inexpensive and readily available materials and may be easily applied to surfaces and parts either at the time of their manufacture or after having been assembled as parts or elements of aircraft and other machines. After relatively extended usage the coatings may be renewed or replaced with no ill effects to the surface materials by using the primer thinner (Ligroin) or the like, as a solvent for cleaning and stripping the surface prior to the reapplication of the primer and the graphite, as described above.

It should be understood that the invention is not based upon or dependent upon the theories which we have expressed. Nor is the invention to be regarded as limited to the express procedure or material set forth, these details being given only by way of illustration and to aid in clarifying the invention. We do not regard such specific details as essential to the invention except insofar as they are expressed by way of limitation in the following claims.

We claim:

1. The method of providing an optically transparent electrically conductive coating on a surface which includes the steps of applying a light-transparent resinous film to the surface, allowing the film to dry to a dry to the touch condition, applying dry finely divided graphite to said film, and then distributing the graphite of a particle size no greater than 3 microns on said film to produce an optically transparent electrically conductive coating by burnishing the graphite to an optically transparent condition.

2. The method of producing a light transparent electrically conductive coating on a surface which includes applying a light transparent resinous film to the surface, allowing the film to dry, applying to the dry film divided dry graphite having a particle size no greater than 3 microns, and then distributing and burnishing the applied graphite to produce an optically transparent graphite layer of approximately one graphite platelet thick adhering to the film.

3. The method of producing a transparent electrically conductive coating on a surface which includes applying a transparent resinous film to the surface, allowing said film to dry to a dry to the touch condition applying to the film dry divided graphite having a particle size no greater than 3 microns, and then distributing and evening the applied graphite to increase the optical transparency and to decrease the electrical resistance of the coating by rubbing the resultant coating with pile fabric.

4. The method of providing a light-transparent electrically conductive coating on a surface which includes the steps of applying a volatile solvent-resin primer having a solids content of from 0.01% to 0.2% by weight to said surface to provide an adherent film of such thinness as to substantially unaffect the optical properties of the surface, allowing the film to dry, applying to said dry film graphite having a particle size no greater than 3 microns, and then burnishing the resultant coating to a substantially completely light transparent condition and to a desired electrical resistance per square.

5. The method of providing an electrically conductive light-transparent coating on a surface which includes the steps of cleansing said surface with a liquid cleanser containing an agent for minimizing the subsequent development of static charges on said surface, removing said cleanser from said surface in a manner to leave thereon a residue of said agent, providing on said cleansed surface a light-transparent adherent primer film by applying thereto a volatile solvent-styrene polymer mixture having a solids content of 0.01% to 0.2% by weight by rubbing the same on said surface to a film thickness which substantially unaffects the optical properties of the surface, allowing said film to dry, applying divided graphite of approximately 3 micron particle size or less to said dry film, and then spreading and burnishing the applied graphite to a light-transparent condition and to have an electrical resistance of from $10^4$ to $10^9$ ohms per square.

6. An article comprising a structure presenting a surface, and a light-transparent electrically conductive coating on the surface comprising a thin light-transparent resinous film adhering to the surface, and finely divided graphite having a particle size no greater than 3 microns adhering to the film, the particles of the graphite being so distributed and related on said film as to substantially unaffect the optical properties of the film or surface and to provide an electrical resistance of from $10^4$ to $10^9$ ohms per square.

7. An article comprising a member, a thin light transparent styrene plastic film adhering to the member, and a layer of graphite of 3 micron particle size or less adhering to said film, the thickness and particle distribution of said layer being such that the layer is light transparent and has an electrical resistance of from $10^4$ to $10^9$ ohms per square.

8. The method of providing a light-transparent electrically conductive coating on a surface which includes the steps of depositing a thin light transparent substantially solvent-free adherent film on said surface by applying thereto a mixture of from 50 to 500 grams of aliphatic petroleum volatile diluent, from 0.1 to 0.5 gram polystyrene having a molecular weight of from 500 to 1000 and from 0.001 to 0.010 gram polyisobutylene having a molecular weight of at least 25,000 and then allowing the film to dry by release of said diluent, applying to the dry film divided by graphite having a particle size no greater than 3 microns, and then rendering the resultant coating light-transparent and conductive to have an electrical resistance of from $10^4$ to $10^9$ ohms per square by spreading and burnishing the applied graphite on the film.

References Cited in the file of this patent

UNITED STATES PATENTS

| Number | Name | Date |
|---|---|---|
| 1,481,936 | Thomson | Jan. 29, 1924 |
| 1,589,637 | Gillis | June 22, 1926 |
| 1,950,518 | Read | Mar. 13, 1934 |
| 2,021,661 | Kisfaludy | Nov. 19, 1935 |
| 2,332,196 | Bjorksten | Oct. 19, 1943 |
| 2,416,892 | Barnard et al. | Mar. 4, 1947 |
| 2,427,979 | Sorensen | Sept. 23, 1947 |
| 2,443,782 | Barnard et al. | June 22, 1948 |
| 2,493,745 | Blodgett et al. | Jan. 10, 1950 |
| 2,531,541 | Spicer | Nov. 28, 1950 |
| 2,647,464 | Ebert | Aug. 4, 1953 |

FOREIGN PATENTS

| Number | Country | Date |
|---|---|---|
| 406,581 | Great Britain | Mar. 1, 1934 |
| 506,855 | Great Britain | June 6, 1939 |

OTHER REFERENCES

McCutcheon: Soap and Sanitary Chemicals, October 1949, page 50.